United States Patent [19]

Budzowski

[11] 4,407,684
[45] Oct. 4, 1983

[54] APPARATUS AND METHOD OF APPLYING AN ELONGATED STRIP TO A TIRE COMPONENT BUILDING DRUM

[75] Inventor: Ronald L. Budzowski, Munroe Falls, Ohio

[73] Assignee: The General Tire & Rubber Company, Akron, Ohio

[21] Appl. No.: 258,201

[22] Filed: Apr. 27, 1981

[51] Int. Cl.³ .............................................. B29H 17/10
[52] U.S. Cl. ................................ 156/133; 156/405.1; 271/273
[58] Field of Search .................. 156/405 R, 406, 397, 156/133; 242/76, 55, 78.8; 226/90, 91, 89; 271/272, 273, 274

[56] References Cited

U.S. PATENT DOCUMENTS

| | | |
|---|---|---|
| 1,209,161 | 12/1916 | Hoyt . |
| 1,228,196 | 5/1917 | Fisher . |
| 2,690,785 | 12/1950 | McWilliams . |
| 3,038,524 | 6/1962 | Bosomworth . |
| 3,455,764 | 7/1969 | Bryant . |
| 3,537,936 | 11/1970 | Leblond . |
| 3,600,252 | 8/1971 | Henley et al. . |
| 3,716,442 | 2/1973 | Hineline . |
| 3,837,967 | 9/1974 | Symons . |
| 3,841,941 | 10/1974 | Leblond et al. . |
| 3,844,871 | 10/1974 | Habert et al. . |
| 3,876,488 | 4/1975 | Uemura et al. . |
| 4,120,717 | 10/1978 | Rost ................................ 156/405 R |

Primary Examiner—Michael W. Ball

[57] ABSTRACT

An apparatus and a method for feeding an elongated strip onto a tire component building drum are especially adapted for applying breaker strips to giant radial tire breaker building drums. The apparatus includes a carriage with roller means for conveying the strip that is mounted on the same side of the building drum as the operator stands while applying the strip to the drum. The carriage is movable on a track on a frame mounted on a floor on which the operator stands, and the track and frame extend upwardly from the floor and are preferably slanted toward the drum. A roll of strip to be applied to the drum is contained in a roll support means near where the frame is mounted on the floor, and the strip is unwound from the roll and passed over rollers on the carriage and onto the drum. By moving the carriage on the track, the position of the carriage can be adjusted to the position that is best, in the judgment of the operator, for applying the strip to the drum.

9 Claims, 8 Drawing Figures

APPARATUS AND METHOD OF APPLYING AN ELONGATED STRIP TO A TIRE COMPONENT BUILDING DRUM

This invention relates to the feeding of strip, such as a rubberized tire fabric layer, onto a tire component building drum. The apparatus and method embodying the invention are especially useful for applying breaker strips to a giant radial tire breaker building drum.

In the building of the breaker section for a large truck or giant radial tire, the equipment for conveying the breaker strip to the drum is usually very large and expensive. This is because such equipment usually includes enlarged versions of the conventional apparatus for servicing the building drums for smaller tires. Examples of this apparatus include large frames holding a plurality of tiltable trays from which different tire components can be delivered to the drum, such as shown in U.S. Pat. Nos. 3,038,524 and 3,600,252; and complicated conveyor systems involving many drums, rollers, pulleys, belts and festooning operations for holding the strip components in proper tension during their application to the drum, and for maintaining each strip component in a ready position for application to the drum while other tire building procedures are performed as shown in U.S. Pat. Nos. 3,455,764; 3,837,967; 3,841,941; and 3,844,871. However, equipment of this kind is mainly designed for improving the efficiency of producing smaller tires. When the same techniques are applied to the larger, heavier components of giant tires and very large truck tires, the increased weight and size of the equipment makes it extremely expensive, and often the equipment fails to operate as effectively and efficiently as it does for smaller tires.

Simpler conveyor systems alone are not the answer. The equipment used in the early days of tire building such as shown in U.S. Pat. Nos. 1,209,161 and 1,228,196 had only a few pulley wheels, but they lacked the tensioning and edge positioning control needed for building high quality modern tires.

The apparatus of the present invention departs from the designs of prior conveyor systems, not only in its simplicity, but by several important design features that enable the person operating the apparatus and the associated building drum to apply strip to the drum uniformly. These features include the positioning of the feeding apparatus on the same side of the drum as the operator stands, so that the operator can see the strip as it is fed through the rollers of the apparatus and before it reaches the drum. This allows the operator to see possible problems that might occur with respect to the alignment and tensioning of the strip, and take corrective action at an earlier time, in contrast to the apparatus of the above mentioned patents, where the only place for the operator to stand is on the opposite side of the drum, making it difficult for him to see the strip coming through the apparatus. Also, with the apparatus and method of the present invention, the roll of strip is stored at floor level or beneath the floor on which the operator stands, and the strip is pulled up from this roll onto a vertically adjustable carriage mounted on a frame that extends upwardly from the floor, and is slanted toward the drum. This allows the heavy roll of strip to be stored in a convenient, out-of-the-way place and the movable carriage can be used to raise the strip up to the drum, in cases where the strip is too heavy to be pulled up by the hands of the operator.

Apparatus is known for applying narrow strips of tread rubber to the same side of a giant tire building drum as an operator might stand. For instance, U.S. Pat. No. 3,716,442 shows such an apparatus. However, such apparatus does not provide the vertically adjustable strip conveying carriage of the present invention, nor the convenient storage place for the roll from which the strip is unwound. Thus, a rather complicated system of pulleys and festooning devices are required. These devices interfere with the operator's positioning himself close to where the strip is being applied to the drum, from where he can spot problems easily and take quick corrective action.

A horizontally movable carriage for conveying strip to a tire building drum is shown in U.S. Pat. No. 3,876,488. However, as with most other known servicing apparatus, the strip is fed into the drum along a substantially horizontal path using at least one festooning device, and stands in the way of the operator trying to observe the strip as it travels toward the drum. Also, since the carriage is movable only in the horizontal direction, it cannot be used by the operator to lift heavy strip from floor lever to drum level which is usually a difficult process in the building of giant tires.

The movable carriage of the present invention includes adjustable edge guide members that control the edges of the strip as it travels toward the drum. These edge guide members are adjustable toward and away from each other to accommodate different widths of strip, by means of turning a threaded screw extending between the guide members. Similar threaded screw systems for moving strip guide members toward and away from each other are shown in U.S. Pat. Nos. 2,690,785 and 3,537,936 and are not claimed to be applicant's invention, apart from their use in the strip feeding apparatus as set forth in the appended claims.

In summary, the present invention resides in an apparatus for feeding an elongated strip onto a tire component building drum that has a floor located adjacent to one lateral side of said drum for holding a person who operates the strip-feeding apparatus and the building drum. The strip-feeding apparatus include an elongated frame having track extending lengthwise of the frame, and a carriage mounted on the track and movable along the length of the track, the carriage being equipped with roller means for holding the conveying the elongated belt strip to the drum. The invention is characterized by the improvement in which the frame is mounted on the floor that supports the drum operator and is located on the same side of said building drum as the floor. The frame and the track extend upwardly from the floor and laterally toward the building drum. Also, means are mounted on the frame for driving the carriage up and down the track and for fixing the position of the carriage on the track at a location with respect to the building drum which is convenient for use in conveying and applying the elongated strip to the drum.

In the preferred embodiment, the apparatus of the invention also includes a support means for a roll of the elongated strip that is located beneath said frame and immediately adjacent said drum so as to be out of the way of said person standing on the floor and operating the drum and the apparatus.

The invention also resides in a method of feeding an elongated strip onto a tire component building drum that is characterized by the improvement comprising the steps of (a) placing a roll of strip on a roll support means on the side of the building drum intended for a person to stand while operating the drum and wrapping components of a tire onto the drum; (b) passing the strip from the roll over conveyor means located adjacent said side of the building drum; and (c) passing the strip from the conveyor means onto the building drum.

In the preferred embodiment, the method of the invention also includes the steps of securing an end of the strip between rollers of the conveyor means at a location near the elevation of the roll support means, and moving said conveyor means up a track that is slanted toward the building drum to unwind the strip from the roll and carry the end of the strip upwardly and toward the location on the building drum where the strip is to be passed onto the drum, and then stopping the conveyor means on the track and fixing the conveyor means at a location convenient for applying the strip to the drum.

The foregoing objects, advantages, and features of the present invention will be more apparent from the following description and the attached drawings in which.

Figure 1:
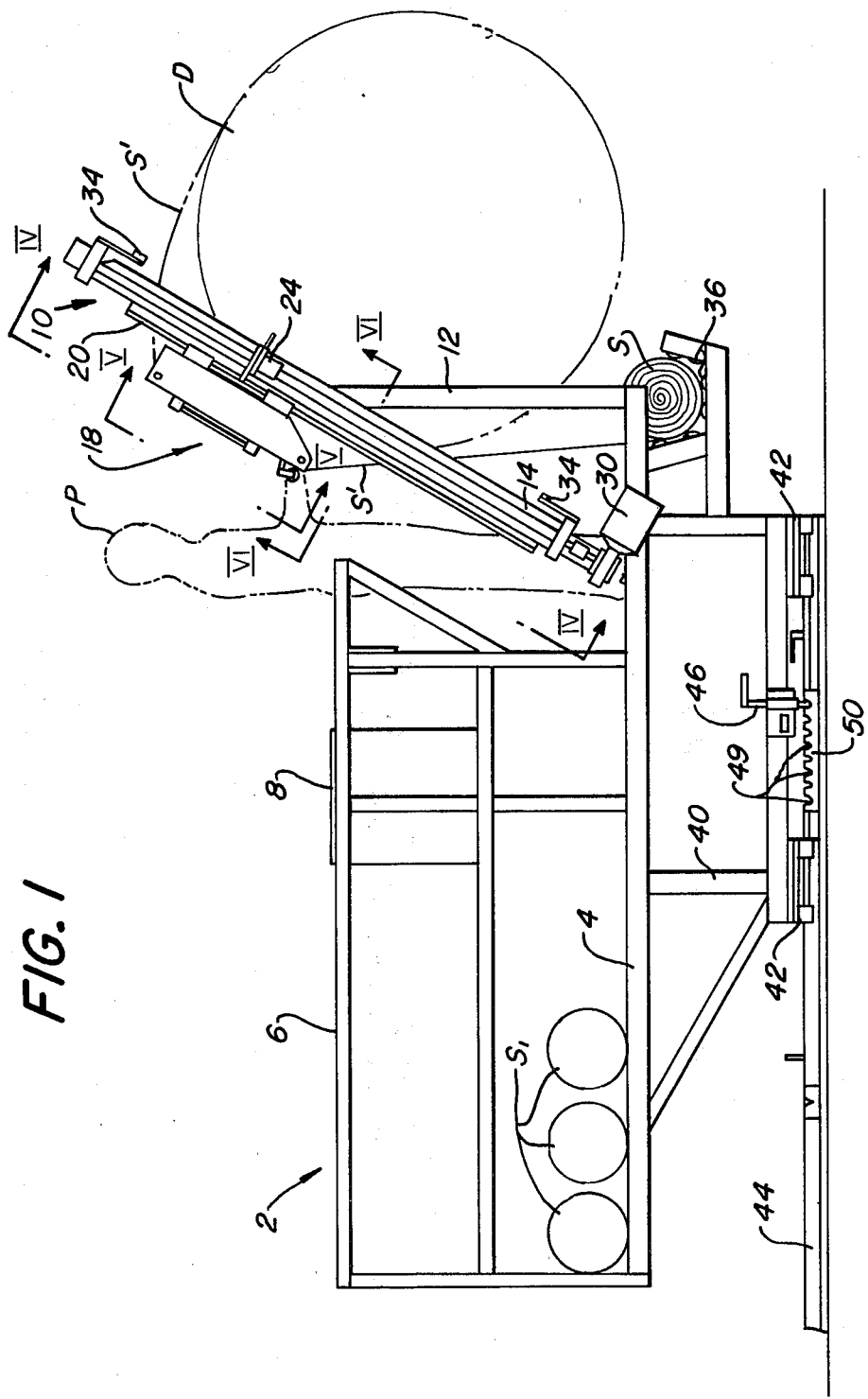
FIG. 1 is a side elevation of a strip-feeding apparatus embodying the present invention, and showing on the right side of the outline of a building drum in chain lines.

Referring to FIG. 1, a strip feeding apparatus 2 is designed for feeding a roll of breaker strip S onto a giant radial tire breaker building drum D shown in chain lines. The strip feeding apparatus 2 has a floor 4, designed to hold a person P, shown in chain lines in FIG. 1, who operates the building drum D and applies the breaker strip from the roll S onto the drum D. Safety railings 6 are mounted along the side and back edges of the floor 4. An electrical control box 8 is mounted on one of the safety railings 6 near where the operating person P stands.

Figure 2:
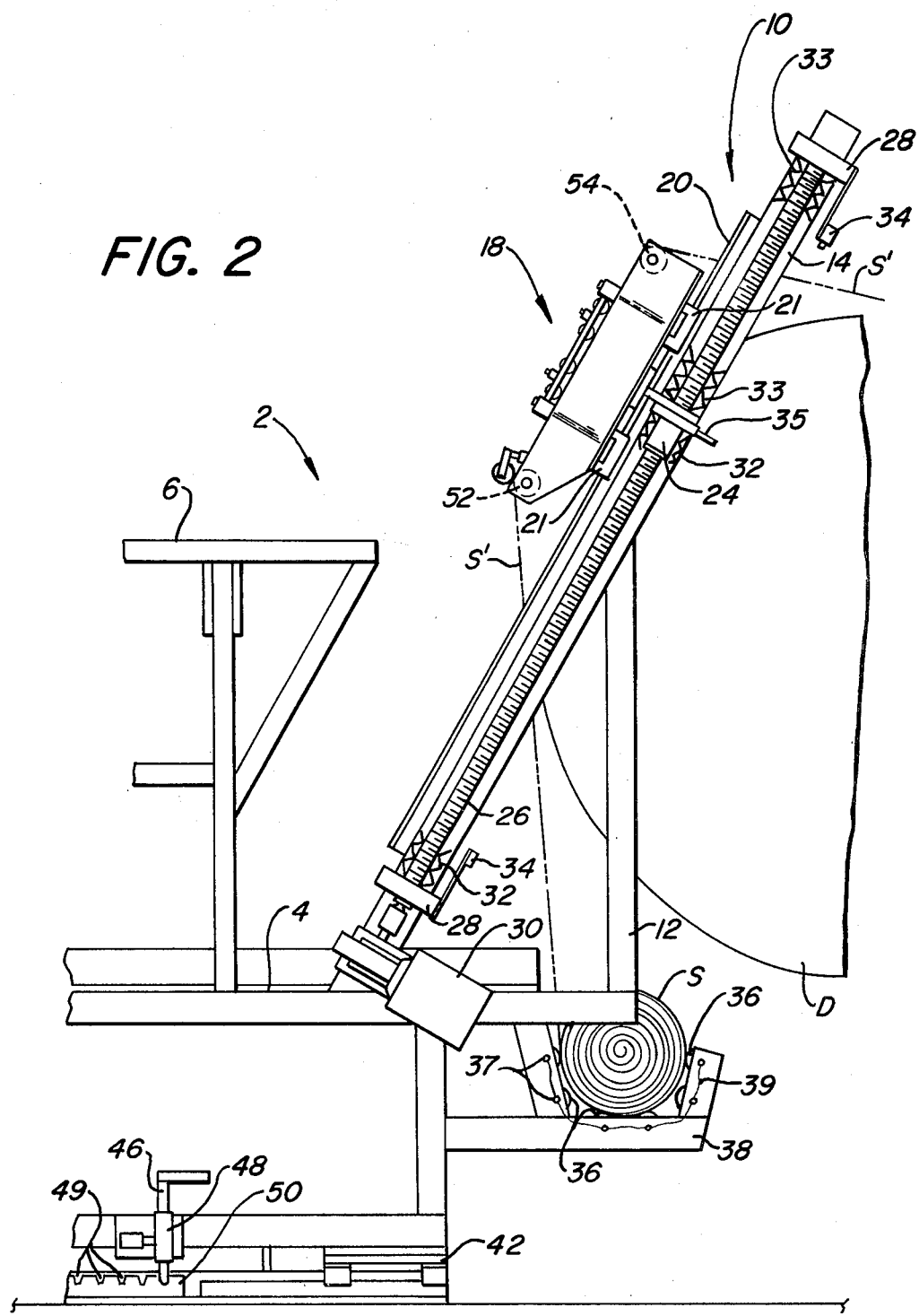
FIG. 2 is an enlarged side elevation of the top portion of the strip-feeding apparatus shown in FIG. 1.
Figure 4:
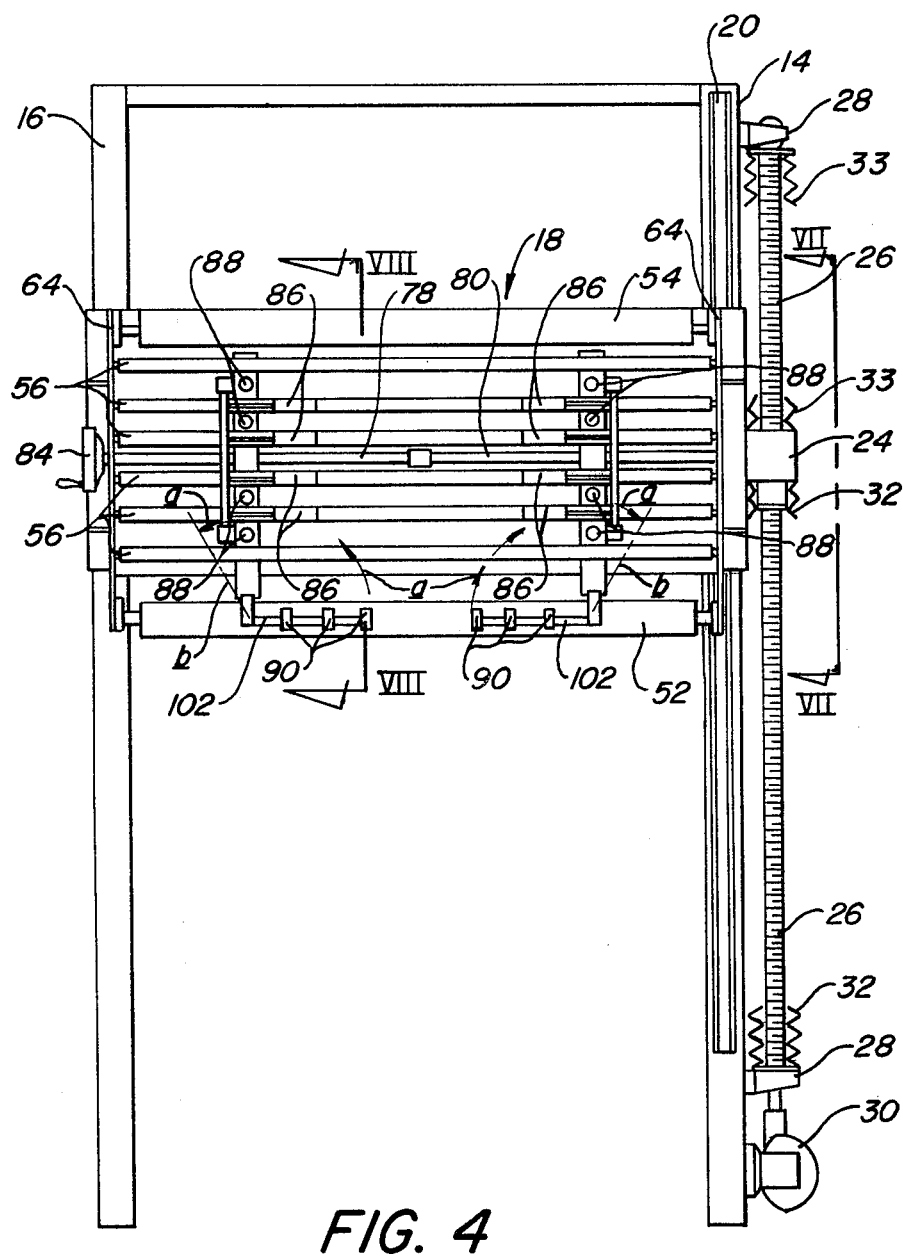
FIG. 4 is a view of a portion of the apparatus of FIG. 1, taken along line IV—IV of FIG. 1.
Figure 5:
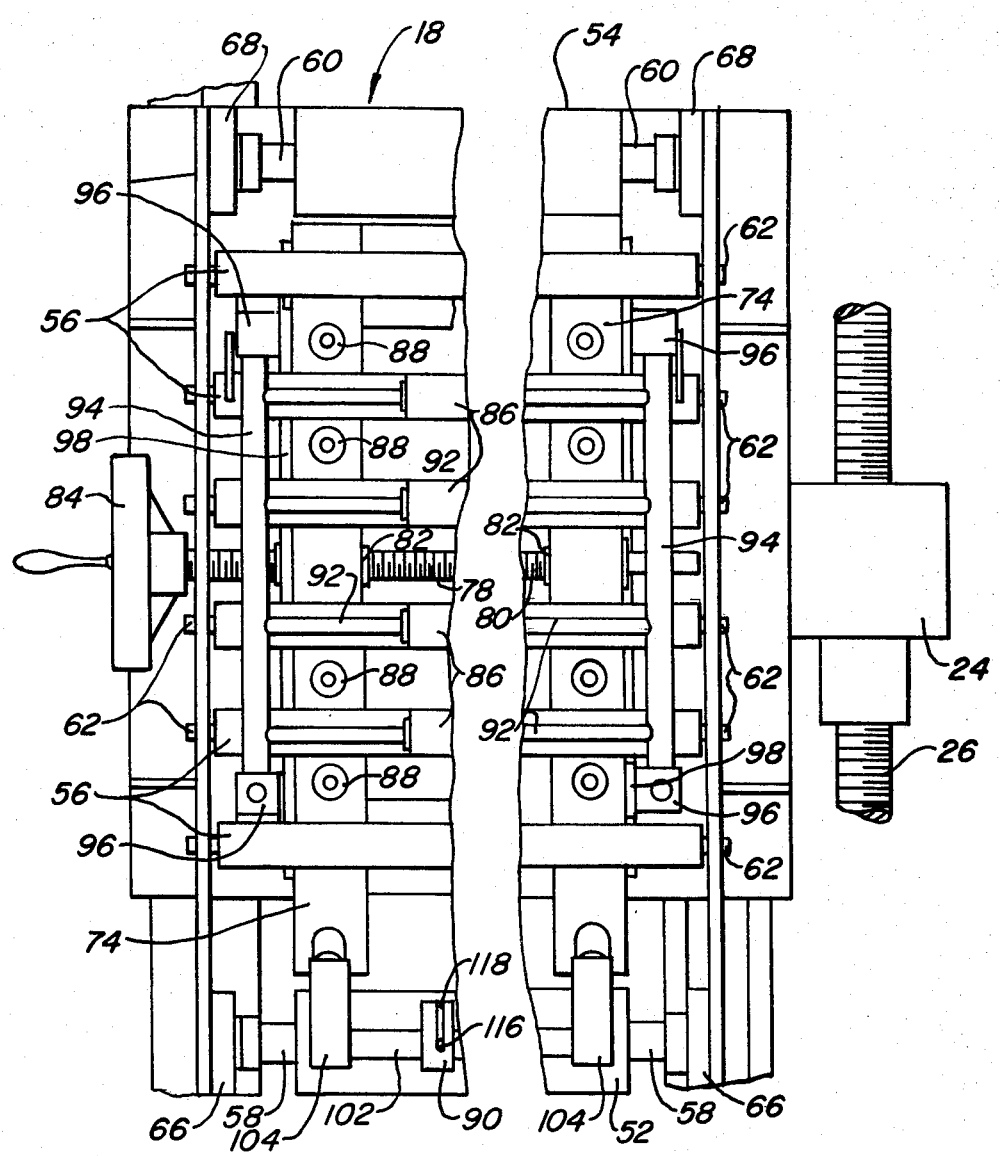
FIG. 5 is an enlarged view of a portion of the apparatus shown in FIGS. 1 and 4, taken along line V—V of FIG. 1, with the central part of the apparatus broken out so that only the lateral side portions are shown.

An elongated frame 10, seen best in the side view of FIG. 2 and the front view of FIG. 4, is mounted at its lower end on the floor 4 and slants upwardly and toward the building drum D. The frame 10 is further supported in this slanted position by vertical struts 12 (FIG. 2). The frame 10 includes track members 14 and 16 that extend lengthwise along the frame and serve as supports for a carriage 18 that is movable along the length of the frame. The track member 14 carries a rail 20, to which one side of the carriage 18 is slidably attached by means of a split bearing supports 21, as seen in detail in FIG. 6. The track member 16 does not carry a special rail but simply supports roller wheels 22 (FIG. 6) mounted on the underneath side of the carriage 18.

As shown in FIG. 4, the carriage 18 is connected by an internally threaded sleeve 24 to an elongated screw 26, rotatably supported in brackets 28 on the side of the track member 14. The screw 26 is rotated by means of an electric motor 30 to adjust the position of the carriage 18 along the length of the frame 10. Preferably, bellows 32 and 33, partially shown in section in FIGS. 2 and 4, cover the screw 26 to protect the screw from dirt that could interfere with its operation. Limit switches 34 mounted on each of the brackets 28 automatically stop the motor 30 driving the carriage 18, whenever contacted by stop plate 35 mounted on the threaded sleeve 24. The limit switches 34 thus prevent the carriage 18 from travelling past the ends of track members 14 and 16.

The roll of breaker strip S that is being applied to the drum D is supported in an elongated trough formed by rollers 36, best seen in FIG. 2. The rollers 36 have axes extending parallel to the axes of the building drum D and are rotatably mounted on pins 37. The pins 37 are in turn held in end brackets 38 and kept from rotation by wires 39 extending through holes adjacent the ends of pins 37. The trough formed by the rollers 36 and the end brackets 38 is connected to the floor 4, preferably so that the roll of strip S is supported beneath the floor 4 and immediately adjacent to the drum D and out of the way of the person P standing on the floor 4 and operating the drum D. With the roll of strip S held in this position, a length S' of breaker strip is unwound from the roll and extends upwardly to the carriage 18, through the rollers of the carriage 18, and onto the building drum D.

Figure 3:
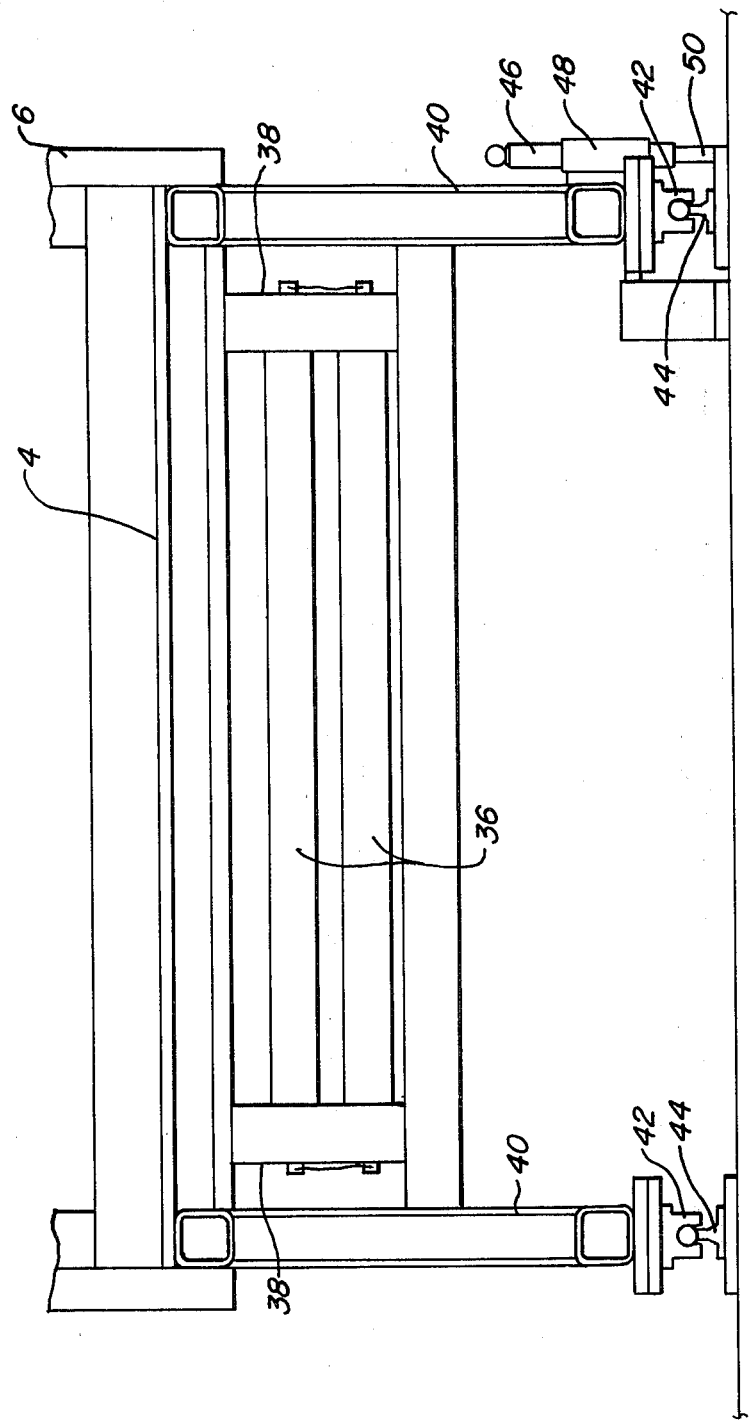
FIG. 3 is an end elevation of the left-hand end of the bottom portion of the apparatus shown in FIG. 1.

The frame 10 as well as the roll of breaker strip S can be adjusted in their distance from the building drum D by moving the floor 4 toward or away from the drum D. To enable the floor 4 to be moved, it is mounted on a support frame 40 that includes split bearing shoes 42 which are supported on rails 44 seen from the side in FIG. 1 and in the enlarged end view of FIG. 3. The floor 4 is locked in a desired position along the length of the rails 44 by means of a pin 46 that extends through a sleeve 48 mounted on the side of the support frame 40. The bottom end of pin 46 is dropped onto one of a number of recesses 49 in a locking bar 50 that is mounted adjacent to and parallel to one of the rails 44. To move the floor 4 to another position along the length of rails 44, one simply lifts the pin 46 from the recess 49 in the locking bar 50, pushes the support frame 40 of the floor 4 by hand along the rails 44 to its new desired position, and drops the pin 46 into another recess 49 of the locking bar 50.

Figure 6:
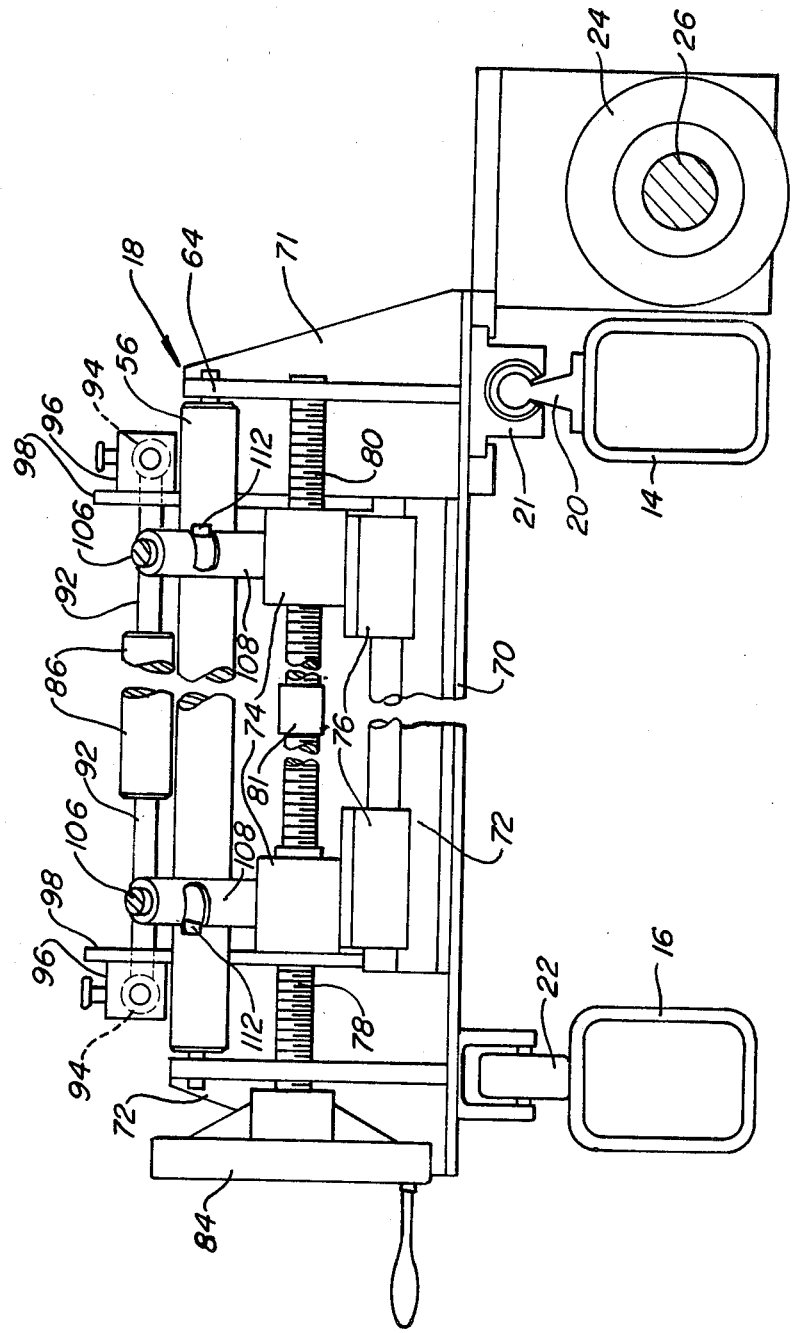
FIG. 6 is an enlarged view of the same portion of the apparatus of FIG. 1 as shown in FIG. 5, but taken along line VI—VI of FIG. 1.
Figure 7:
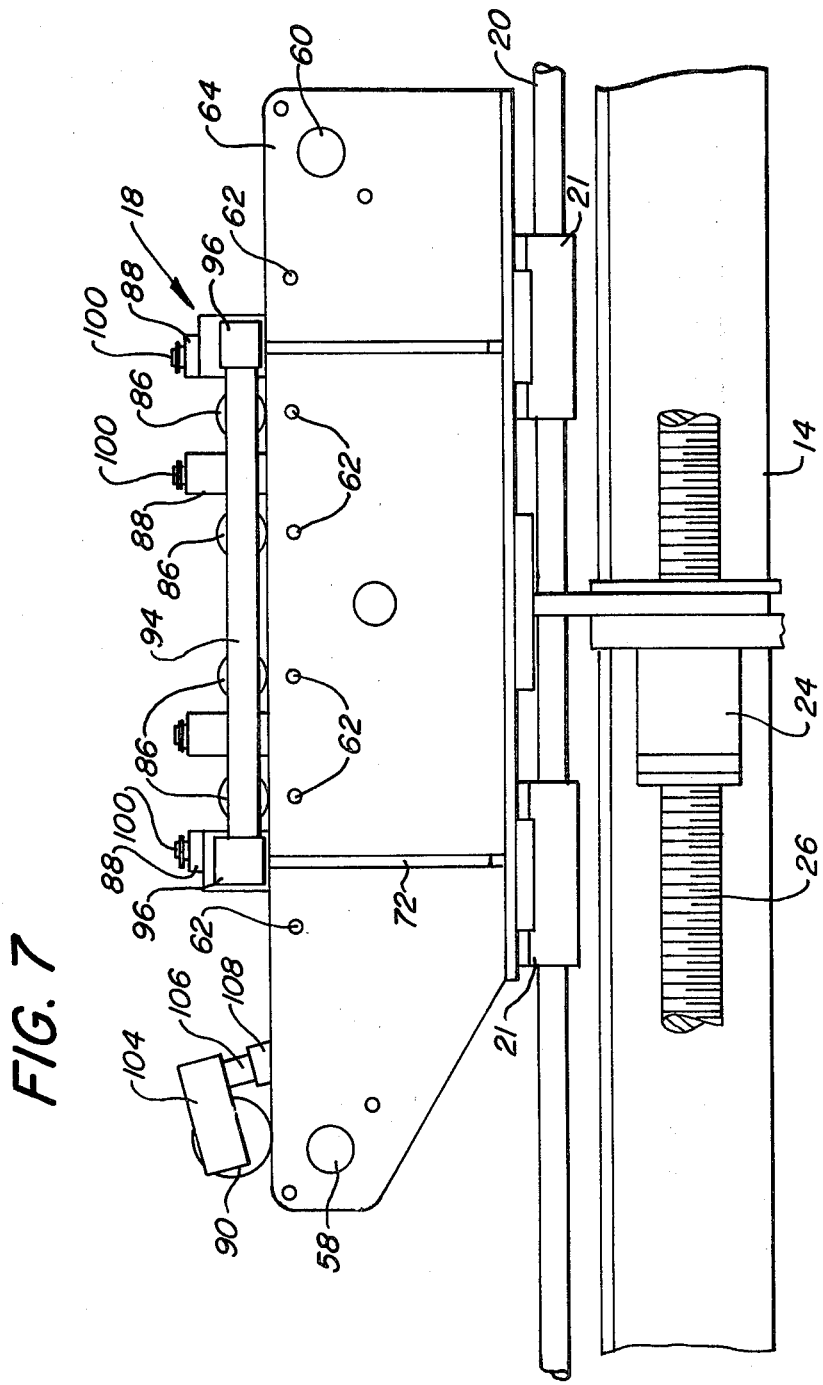
FIG. 7 is a side view of an enlarged portion of the apparatus shown in FIGS. 4 and 5 taken along line VII—VII of FIG. 4.

As shown in detail in FIGS. 5-8, the carriage 18 includes various rollers for supporting and guiding the strip S from the point where the strip S enters the carriage 18 at a large roller 52 that is nearest the floor 4 to the point where the strip S leaves the carriage 18 at a large roller 54 that is nearest the drum D. The rollers 52 and 54 are parts of a first bed that rollers that also include six intermediate smaller rollers 56. The rollers 52, 54 and 56 can be seen from the top in FIG. 5 and in cross section in FIG. 8. The rollers 52, 54, and 56 are rotatably mounted at their ends on pins 58, 60, and 62, respectively, that are mounted in holes in plates 64 extending along the sides of carriage 18 (FIGS. 6 and 7). The pins 58 and 60 for rollers 52 and 54 are additionally supported in bearing members 66 and 68, respectively, which are fastened to the inside surfaces of plates 64.

As seen best in FIG. 6, the plates 64 of the carriage 18 are supported on the side edges of the carriage's bottom plate 70. Two braces 71 on the external surfaces of each plate 64 help to maintain the plates 64 perpendicular to the bottom plate 70. The bottom plate 70 is turn supported on the track members 14 and 16 by the rollers 22, split bearing 21, and track 20.

Figure 8:
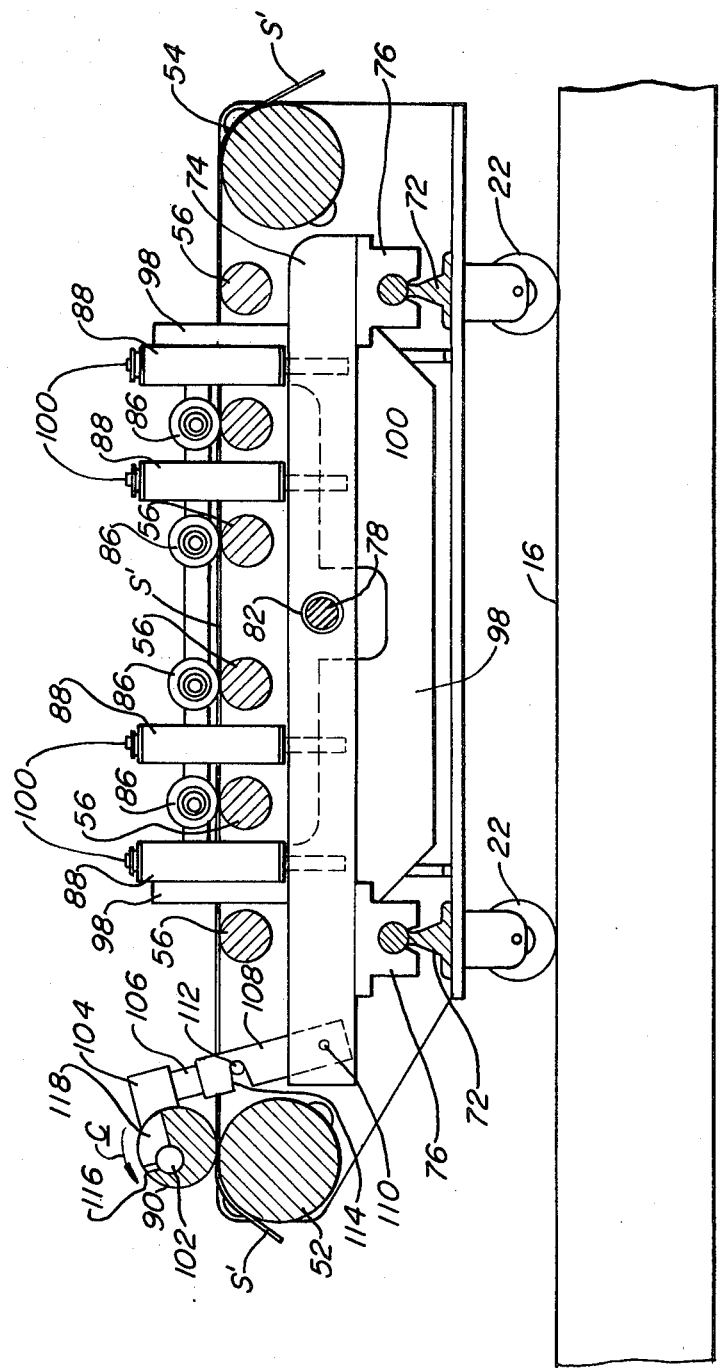
FIG. 8 is a cross-sectional view of an enlarged portion of the apparatus shown in FIGS. 4 and 5, taken along line VIII—VIII of FIG. 4.

The bottom plate 70 also supports two rails 72 that extend widthwise of the carriage 18 and inside the space between the places 64. Elongated carriers 74 are mounted on the rails 72 and, as best seen in FIG. 8, each carrier 74 extends perpendicular to the rails 72 and is slidably connected to the rails 72 by split bearing members 76. The carriers 74 are connected to each other by means of screws 78 and 80, connected together by a coupling 81. The screws 78 and 80 engage threaded sleeves 82 mounted in each carrier 74, and the screw 73 is threaded in the opposite direction from the threading of screw 80. Thus, when handle 84 on the end of screw 78 is turned, the carriers 74 move either toward or away from each other, along the rails 72.

As seen best in FIG. 8, the carriers 74 support three important sets of rollers, namely the second (or top) bed of rollers 86, edge control rollers 88, and eccentrically-mounted wheels 90.

The second bed of eight rollers 86 is mounted above the rollers 56 of the first bed (that is on the side of the rollers 56 away from the track members 14 and 16). The rollers 86 are rotatably mounted on rods 92 that are connected to shafts 94 extending parallel to the tracks 14 and 16. The rods 92 are perpendicular to the shafts 94 and the shafts 94 are rotatably mounted in bearing supports 96. The bearing supports 96 are in turn fixed to plates 98 connected to the carriages 74. The shafts 94 can thus be rotated to raise the rollers 86 to positions that are past the perpendicular position with respect to the rollers 56, so that the elongated strip S' may be laid on top of the rollers 56 in the first bed without interference from the rollers 86 of the second bed. After the strip S' is laid on the rollers 56 on the first bed, the shafts 94 are rotated to place the rollers 86 in their position shown in FIGS. 5, 6, 7 and 8 wherein they are axially aligned over the rollers 56 of the first bed and in nipping engagement with the elongated strip S'. Thus, the strip S is retained between the rollers 56 and 86 as shown in FIG. 8.

Four edge control rollers 88 keep the edges of the strip S' from lateral movement as the strip passes between the first bed of rollers 56 and the second bed of rollers 86. The edge control rollers are rotatably held on rods 100 that have their axes perpendicular to the plane of the axes of the first bed of rollers 56. The rods 100 are mounted directly on the elongated carriers 74 that extend parallel to the track members 14 and 16. Thus, by turning the handle 84 to rotate the screws 78 and 80 the carriers 74 can be moved either toward or away from each other to adjust the positions of edge control rollers 88, to accommodate various widths of strip S'.

Eccentrically mounted wheels 90 are mounted on shafts 102 (FIGS. 4, 5, and 8), that are connected by brackets 104 to rods 106. The rods 106 are rotatably supported in sleeves 108, which are, in turn, supported in a slanted position in holes in elongated carriers 74. The sleeves 108 are fixed to the carriers 74 by pins 110 (FIG. 8) and each rod 106 can rotate within its sleeve 108, to the extent permitted by pin 112, which is connected to the rod 106 and is confined in a slot 114 in the sleeve 110. The pin 112 and slot 114 are designed to allow each rod 106 to carry each shaft 102 and eccentrically mounted wheels 90 from their positions shown in FIGS. 4, 5, 7 and 8, through arcs of approximately 135° in the directions of arrows a (FIG. 4), to the chain line positions b indicated in FIG. 4.

The eccentrically mounted wheels 90 are also themselves limited in their rotation to an arc of approximately 90°, by pins 116 (FIGS. 5 and 8) which are connected to the shafts 102 and are confined in slots 118 in the wheels 90. Thus, each wheel 90 is rotatable from its position shown in FIG. 8, where it normally sits when not subjected to forces other than gravity, to a raised position 90° removed in the direction of arrow c (FIG. 8), when a force caused by the raising of the strip S' causes the eccentric wheels 90 to be so raised. In the position shown in FIG. 8, each wheel 90 is directly above the large roller 52 and in nipping engagement with the strip S' as it passes over the roller 52.

In the operation of apparatus 2, the operator P (FIG. 1) takes one of several rolls of strip $S_1$ that are stored at the back end of floor 4 (FIG. 1), and rolls it along the floor until it drops into the trough formed by rollers 36, so that it is in the position of the strip roll S in FIG. 1. If the strip is of relatively light weight so that a two meter length of it can be lifted relatively easy, the operator P first untapes the lead end of the roll of strip $S_1$ before rolling it along the floor 4. Then when the roll of strip $S_1$ is in the position of the roll S in FIG. 1, he lifts the rolled-out tail of strip S' from the floor 4 up to the lead roller 52 on carriage 18 as seen best in FIG. 2. In this case, the operator P will have already adjusted the position of carriage 18 along the track members 14 and 16 of frame 10 to the desired position of the carriage 18 for conveying the strip S' onto the building drum D. He moves the carriage 18 along the track members 14 and 16 by operating appropriate buttons on control panel 8 (FIG. 1) which controls the operation of drive motor 30.

Prior to setting the strip S' on the rollers of carriage 18, the shafts 102 carrying eccentrically mounted wheels 90 should be turned to their out-of-the-way positions indicated by chain lines b in FIG. 4. Also, the second bed of rollers 86 should be rotated about the axes of their supporting shafts 94 to out-of-the-way positions where they do not interfere with the laying of strip S' on top of the rollers 56. In addition, elongated carrier 74 should be set by appropriate rotation of handle 84 so that the edge control rollers 88 are properly spaced for accommodating the width of the strip S'. With the second bed of rollers 86, edge control rollers 88, and eccentrically mounted wheels 90 thus positioned, the operator P places the strip S' over the rollers 52, 54 and 56 that form the first bed of rollers on carriage 18. He then makes sure that the edges of the strip S' are positioned properly within the confines of the vertical edge control rollers 88, making any necessary adjustments to the rollers 88 by turning the handle 84.

Next, the operator manually strips away the plastic liner covering that is used to protect the outer surface of the strip S' while it is in its rolled condition. At this point in the procedure, the liner is stripped away only in the immediate area of the carriage 18 and in the portion of the strip S' that extends from the carriage 18 to the drum D. The operator P then swings the shafts 102 carrying the eccentric rollers 90 to the positions shown in FIGS. 4, 5, 7 and 8 thus locking the strip S' between the eccentric rollers 90 and the large rollers 52. Then the second bed of rollers 86 are rotated about shafts 94 to their positions shown in FIGS. 4–8. When that operation is complete, the strip S' is fully secured to the carriage 18 and the tail end of the strip S' is ready to be tacked to the surface of drum D.

After tacking the strip S' to the drum D, the operator P rotates the drum, thus pulling the strip S' from the roll of strip S through the rollers of carriage 18. As the strip S' is pulled from the roll of strip S, the operator manually strips the liner away from the strip and lets it fall at his feet. This operation requires little effort since the liner is not pressure wrapped on the strip. The carriage 18 is positioned on the frame 10 so that the operator P can see the line-light guides on the building drum D to ensure that the strip S' is being applied at its proper position on the drum D.

In the case of a wide, heavy strip S' where the operator P would have difficulty lifting the strip S' up to a preset position of the carriage 18 on the frame 10, the operator P may start with the carriage 18 moved all the way down to the bottom end of the frame 10. With the carriage 18 so positioned, the operator can easily pull the end of the strip S' the short distance required for laying it on top of the nearby rollers 52 on the carriage 18. The operator P fully secures the strip S' to the carriage 18 in the manner discussed above, except that the carriage 18 remains at the bottom of frame 10. With the strip S' so secured, the operator pushes the button on panel 8 to operate the motor 30 and drives carriage 18 up the frame 10 to the desired position of the carriage to apply to strip S' to the drum D. In all other respects, the procedure for applying the strip S' to the drum D are the same as described above.

When the entire roll of strip S has been applied to the drum D, the operator P again turns on the motor 30 to drive the carriage 18 further up the frame 10 until it is stopped by the stop plate 35 contacting the upper limit switch 34. With the carriage 18 in this position, the operator P has clear access to the drum for the purpose of trimming the strip S' and performing any additional operations needed on the strip S' such as butt splicing. After the strip S' has been applied to the drum and all the necessary cutting and splicing operations have been performed on it, the carriage 18 can be rolled to its desired position for applying another roll of strip S to the drum D.

It can thus be seen that the present invention provides a relatively simple apparatus for applying strips of stock to tire component building drums, yet the simplicity of the design is accomplished without sacrificing control in the handling of the strip as it is conveyed to the drum. The apparatus is particularly useful in applying breaker stock to breaker band building drums in the making of giant radial tires. However, it can also be used to convey other types of strip to other types of building drums.

While one embodiment of the present invention has been thus shown and described, other embodiments, modifications and additions will, of course, be apparent to those skilled in the art without departing from the scope of the appended claims.

I claim:

1. A method of feeding an elongated strip onto a tire component building drum, characterized by the improvement comprising the steps of:
   (a) placing a roll of said strip on a roll support means on the side of said building drum intended for a person to stand while operating said drum and wrapping components of a tire onto said drum;
   (1) after the step of placing said roll of strip on said roll support means, securing an end of said strip between rollers of a roller means located near the elevation of said roll support means,
   (2) moving said roller means up a track that is slanted toward said building drum to unwind said strip from said roll and carry said end of said strip upwardly and toward the location on said building drum where said strip is to be passed onto said drum, and
   (3) stopping said roller means on said track and fixing said roller means at a location convenient for passing said strip over said roller means and onto said building drum;
   (b) passing said strip over said roller means; and
   (c) passing said strip from said roller means onto said building drum.

2. Apparatus for feeding an elongated strip onto a tire component building drum, that has a floor located adjacent to one lateral side of said drum for holding a person who operates said strip-feeding apparatus and said building drum, said strip-feeding apparatus including an elongated frame having track extending lengthwise of said frame, and a carriage mounted on said track and movable along the length of said track means, said carriage being equipped with roller means for holding and conveying said elongated belt strip, characterized by the improvement comprising:
   (a) said frame being mounted on said floor and located on same side of said building drum as said floor, said frame and said track extending upwardly from said floor and laterally toward said building drum;
   (b) means mounted on said frame for driving said carriage up and down said track and for fixing the position of said carriage on said track at a location with respect to said building drum which is convenient for use in conveying and applying said elongated strip to said drum.

3. The apparatus according to claim 1 characterized also by the improvement comprising:
   (c) roll support means connected to said floor for supporting a roll of said strip, said roll support means confining said roll of strip so that said roll can be unwound while rotating about an axis substantially parallel to the axis of rotation of said drum.

4. The apparatus according to claim 2 wherein said roll support means is located beneath the elevation of said floor and includes a pair of roller-support end brackets connected to said floor, and a plurality of rollers mounted between said end brackets and rotatable about axes substantially parallel with the axis of rotation of said building drum, said rollers being mounted on said end brackets so as to form an elongated trough for holding said roll of strip.

5. Apparatus according to claim 3 wherein said roll support means is located beneath said frame and immediately adjacent said drum so as to be out of the way of said person standing on said floor and operating said drum and said apparatus.

6. Apparatus according to claim 1 characterized also by the improvement comprising:
   (c) means for adjusting the distance of said frame from said building drum.

7. Apparatus according to claim 5 wherein said means for adjusting the distance of said frame from said drum includes a rail for supporting said floor, means slidably connecting said floor to said rail, and lock means for fixing the position of said floor with respect of said rail, whereby said floor and said frame mounted thereon are adjustable in distance from said drum.

8. Apparatus according to claim 1 characterized also by the improvement comprising:
- (c) the said roller means on said carriage including:
  - (1) a first bed of rollers rotatably mounted with axes perpendicular to said track of said frame to the axis of said building drum,
  - (2) a second bed of rollers rotatably mounted on the side of said first bed of rollers away from said track, the rollers of said second bed being connected to at least one shaft extending parallel to said track, said second bed of rollers being mounted with axes perpendicular to said shaft, saif shaft being rotatable to raise said rollers of said second bed to positions wherein said elongated strip may be laid on said first bed of rollers without interference from said second bed of rollers, said shaft also being rotatable to locate the rollers of said second bed in positions axially aligned with said first bed of rollers and in nipping engagement with said elongated strip so that said strip is retained between said beds of rollers, and
  - (2) a plurality of edge control rollers for controlling the edges of said strip as said strip passes between said first and second beds of rollers, said edge control rollers being mounted with axes perpendicular to the plane of said first bed of rollers and on a pair of elongated carriers that extend parallel to said track, and means for moving said elongated carriers toward and away from each other to adjust the positions of said edge control rollers to accommodate various widths of elongated strip.

9. Apparatus according to claim 7 characterized also by the improvement comprising the said roller means on said carriage including:
- (4) a plurality of eccentrically mounted wheels held rotatably on a shaft above the nearest roller to said floor of said first bed of rollers, said eccentrically mounted wheels being rotatable on said shaft upwardly and away from said nearest roller in response to outward movement of said elongated strip as said strip enters said roller means on said carriage, and means limiting the rotation of said eccentrically mounted wheels, thereby limiting the outward movement of said elongated strip, said shaft being swingably connected to said carriage so that said eccentrically mounted wheels can be swung out of the way when said elongated strip is laid on said first bed of rollers.

* * * * *

UNITED STATES PATENT AND TRADEMARK OFFICE
CERTIFICATE OF CORRECTION

PATENT NO. : 4,407,684
DATED : October 4, 1983
INVENTOR(S) : Ronald L. Budzowski It is certified that error appears in the above-identified patent and that said Letters Patent are hereby corrected as shown below:

Column 9, line 20, which reads: "saif" should read ---said---.

Column 10, line 1, which reads: "(2)" should read ---(3)---.

Signed and Sealed this

*Twenty-second* Day of *November 1983*

[SEAL]

Attest:

GERALD J. MOSSINGHOFF

*Attesting Officer*  *Commissioner of Patents and Trademarks*